United States Patent
Halder

(10) Patent No.: US 9,249,821 B2
(45) Date of Patent: Feb. 2, 2016

(54) STOP SCREW HAVING A STOP BUFFER PART

(75) Inventor: Stefan Halder, Achstetten-Bronnen (DE)

(73) Assignee: ERWIN HALDER KG, Achstetten (DE)

( * ) Notice: Subject to any disclaimer, the term of this patent is extended or adjusted under 35 U.S.C. 154(b) by 731 days.

(21) Appl. No.: 13/378,698

(22) PCT Filed: Apr. 7, 2010

(86) PCT No.: PCT/DE2010/075033
§ 371 (c)(1),
(2), (4) Date: Feb. 9, 2012

(87) PCT Pub. No.: WO2010/145647
PCT Pub. Date: Dec. 23, 2010

(65) Prior Publication Data
US 2012/0134740 A1    May 31, 2012

(30) Foreign Application Priority Data
Jun. 18, 2009    (DE) .................... 20 2009 004 931 U

(51) Int. Cl.
*F16B 35/00* (2006.01)
*F16B 35/06* (2006.01)
*F16B 39/04* (2006.01)

(52) U.S. Cl.
CPC ............... *F16B 35/005* (2013.01); *F16B 35/06* (2013.01); *F16B 39/04* (2013.01); *Y10T 403/32557* (2015.01)

(58) Field of Classification Search
CPC ...... F16B 35/005; F16B 35/044; F16B 35/06; F16B 39/10; F16B 39/14; F16B 39/20; F16B 39/08; F16B 39/282; F16B 39/32; F16B 39/108; F16B 35/02; F16B 37/00; F16B 39/04; F16B 39/02; F16B 31/04; F16B 41/002; F16B 5/0208; F16B 21/12; F16B 39/023; F16B 37/145; F16B 39/06; F16D 1/0894; B21H 3/02; B25B 5/163; B25B 27/08; B25B 27/20; B29C 47/20; E01B 9/10; E01B 9/16
USPC .................. 411/393, 204, 221, 315–318, 325
See application file for complete search history.

(56) References Cited

U.S. PATENT DOCUMENTS 3,269,766 A    8/1966  Gardner
4,026,605 A *  5/1977  Emmerich ................... 403/108
(Continued)

FOREIGN PATENT DOCUMENTS

DE    20212656 U    4/2003
EP    0461994 A    12/1991
GB    900320 B     7/1962

*Primary Examiner* — Gay Spahn
*Assistant Examiner* — Flemming Saether
(74) *Attorney, Agent, or Firm* — Andrew Wilford

(57) ABSTRACT

The invention relates to a stop screw (1) having a stop buffer part (2), which at a region located opposite of the stop screw (2) comprises a substantially spherical protrusion (2a). At a region located opposite of the stop buffer part (2), the stop screw (1) comprises a recess for receiving the substantially spherical protrusion (2a) of the stop buffer part (2) in order to form an articulated connection between the stop screw (1) and the stop buffer part (2). In order to limit the articulated connection between the stop screw (1) and the stop buffer part (2), the stop screw (2) comprises a screw contact surface (1a) and the stop buffer part (2) comprises a stop buffer part contact surface (2b) located opposite of the screw contact surface (1a), wherein a resetting element is provided for resetting the stop buffer part (2).

6 Claims, 3 Drawing Sheets

(56) References Cited

U.S. PATENT DOCUMENTS

| | | | |
|---|---|---|---|
| 4,807,499 A * | 2/1989 | Martinez | 411/392 |
| 4,850,630 A | 7/1989 | Davies | |
| 2,190,585 A | 2/1990 | Rhinevault | |
| 5,207,544 A * | 5/1993 | Yamamoto et al. | 411/348 |
| 5,452,979 A * | 9/1995 | Cosenza | 411/348 |
| RE36,351 E * | 10/1999 | Yamamoto et al. | 411/348 |
| 7,645,106 B2 * | 1/2010 | Gordon | 411/393 |
| 8,240,722 B2 * | 8/2012 | Dieling et al. | 292/90 |
| 2008/0226422 A1 * | 9/2008 | Gordon | 411/393 |
| 2010/0109346 A1 * | 5/2010 | Dieling et al. | 292/90 |

* cited by examiner

STOP SCREW HAVING A STOP BUFFER PART

CROSS REFERENCE TO RELATED APPLICATIONS

This application is the US-national stage of PCT application PCT/DE2010/075033 filed 7 Apr. 2010, published 23 Dec. 2010 as WO2010/145647, and claiming the priority of German patent application 202009004931.0 itself filed 18 Jun. 2009.

FIELD OF THE INVENTION

The present invention relates to an abutment screw having a movable part. The present invention relates in particular to an abutment screw having a movable part mounted via a swivel joint on the abutment screw.

BACKGROUND OF THE INVENTION

Conventional abutment screws having a movable part have the disadvantage that under continuous load they malfunction at an is early stage. However, in particular for deployment and use in aircraft, durability and long-term stability are of vital importance.

OBJECT OF THE INVENTION

It is therefore an object of the present invention to increase the durability and the long-term stability of abutment screws.

SUMMARY OF THE INVENTION

This object is solved by an abutment screw having a movable part that, at a region juxtaposed with the abutment screw, has a substantially spherical ball head, and the abutment screw, at a region juxtaposed with the movable part, has a seat receiving a substantially spherical ball head of the movable part in order to form a swivel joint between the abutment screw and the movable part, in that, for limiting swiveling between the abutment screw and the movable part, the abutment screw has a screw contact face and the movable part has a movable part contact face juxtaposed with the screw contact face, and that a resetting element is provided for resetting the movable part. This configuration has the advantage that the pivot angle is limited by the stop faces, and the abutment screw with the movable part can be reset in a material-protective manner into the starting position. It is advantageous if the substantially spherical ball head is mounted without play in the abutment screw so that a seal is formed between the movable part and the abutment screw.

It has proven to be advantageous if the screw contact face and the movable part contact face are annular.

Preferably, a seal ring is provided between the neck of the substantially spherical ball head of the movable part and the is abutment screw, so resetting of the movable part can be effected.

It has proven to be advantageous if the abutment screw has a seat holding a spring. This way, resetting of the movable part is accompanied by a damping effect.

It is particularly advantageous if the spring has turns of different characteristics so that a balancing of the local load, in particular the lateral load, can take place.

Furthermore, the spring-holding seat of the abutment screw can be provided at an end opposite to the spherical ball head so that the spring bears against a flat on the spherical ball head. Alternatively, the spring-holding seat of the abutment screw with the spring provided therein can extend in the abutment screw and into the spherical ball head.

In a preferred embodiment, the spherical ball head has a ball recess for an inner ball against which the spring bears. This configuration has the advantage that a defined axial deformation of the spring can be determined more accurately.

Furthermore, the abutment screw can comprise a displaceable slide with a holder for the spring and at least one latch ball and the slide is formed with a recess for the latch ball in such a manner that the latch ball can be brought from a latching position enabling a latching of the pin arrangement into a releasing position, enabling a releasing of the pin arrangement. The configuration comprising the spring holder has the advantage that the spring can be used in two ways, and the configuration comprising the latch balls has the advantage that the abutment screw can be fixed in place in a particularly secure manner.

Preferably, a cylindrical ball seat is provided around the inner ball. This configuration has the advantages that the inner ball can have relative small dimensions, and by using a stronger material for the cylindrical ball seat, the overall stability of the arrangement can be increased. Furthermore, increased safety is achieved because a one-sided load from the left side is possible.

It has proven to be advantageous if the displaceable slide and/or the cylindrical ball seat are/is formed from a material that has a higher mechanical strength than the material from which the abutment screw and/or the spherical ball head are/is formed.

Alternatively, a spring receiving part can be provided between the spherical ball head and the spring.

It has proven to be useful if the displaceable slide and/or the spring receiving part are/is formed from a material that has a higher mechanical strength than the material from which the abutment screw and/or the spherical ball head are/is formed.

It is particularly preferred if the displaceable slide has a pin.

Furthermore, in the latching position, the latch balls can bear against the outer surface of the displaceable slide, the outer surface being slightly frustoconically tapered so that play is eliminated and a tightening reserve is provided.

In one advantageous configuration, the abutment screw has a one-piece closure. In this manner, safety can be increased because a one-sided load is made possible.

Another aspect of the present invention relates to the combination of an abutment screw according to the invention with a connecting part for the abutment screw that has at least one respective latching recess for each latch ball.

BRIEF DESCRIPTION OF THE DRAWING

The invention is described in more detail below with reference to embodiments illustrated in the drawing. Therein.

SPECIFIC DESCRIPTION OF THE INVENTION

Figure 1:
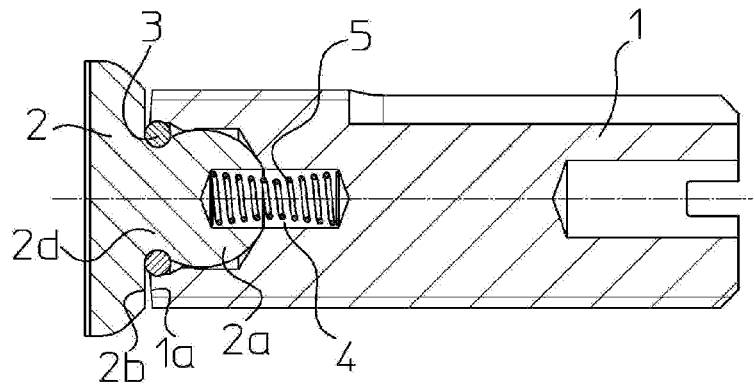
FIG. 1 is a schematic a cross-sectional view of a first embodiment of an abutment screw having a movable part.

FIG. 1 is a schematic sectional view of a first embodiment of an abutment screw 1 having a movable part 2. The abutment screw 1 is formed with a seat in which a substantially spherical ball head 2a of the movable part 2 can swivel. The deflection between the abutment screw 1 and the movable part 2 is limited by a screw contact face 1a and an opposing contact face 2b on the movable part 2. A seat 4 that in the first embodiment extends along part of the abutment screw 1 and into the substantially spherical ball head 2a holds a spring 5 whose turns in this embodiment vary in diameter over the length of the spring 5. A seal ring 3 is provided between a neck 2d of the substantially spherical ball head 2a and the abutment screw 1.

Figure 2:
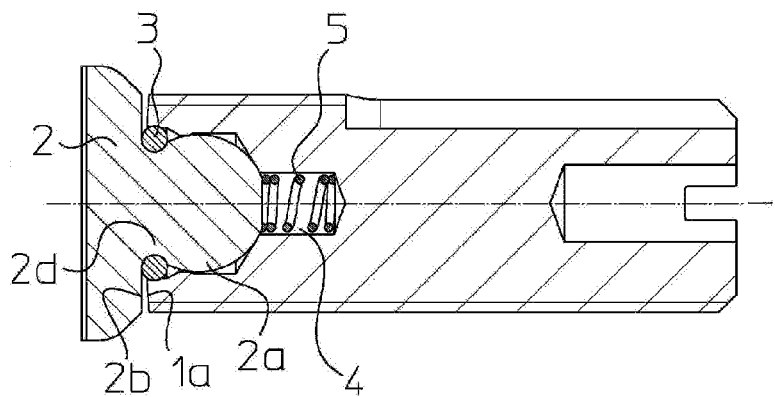
FIG. 2 is a schematic sectional view of a second embodiment of an abutment screw having a movable part.

FIG. 2 is a schematic sectional view of a second embodiment of the abutment screw 1 with the movable part 2. In contrast to the first embodiment illustrated in FIG. 1, the spring-holding seat 4 is formed exclusively in the abutment screw 1, and the spherical shape of the ball head 2a is only formed with an end flat 2e against which the spring 5 bears.

Figure 3:
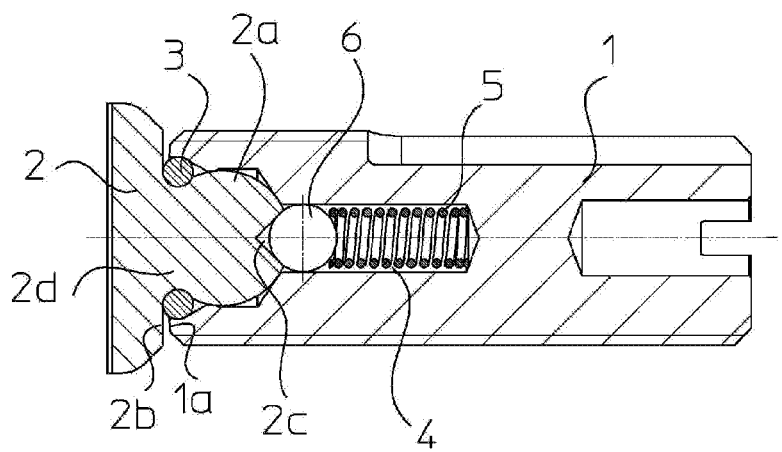
FIG. 3 is a schematic sectional view of a third embodiment of an abutment screw having a movable part.

FIG. 3 is a schematic sectional view of a third embodiment of the abutment screw 1 with the movable part 2. In contrast to the embodiments illustrated in FIGS. 1 and 2, the substantially spherical ball head 2a is formed with a recess 2c in which engages an inner ball 6 lying between the spring 5 and the spherical ball head 2a.

Figure 4:
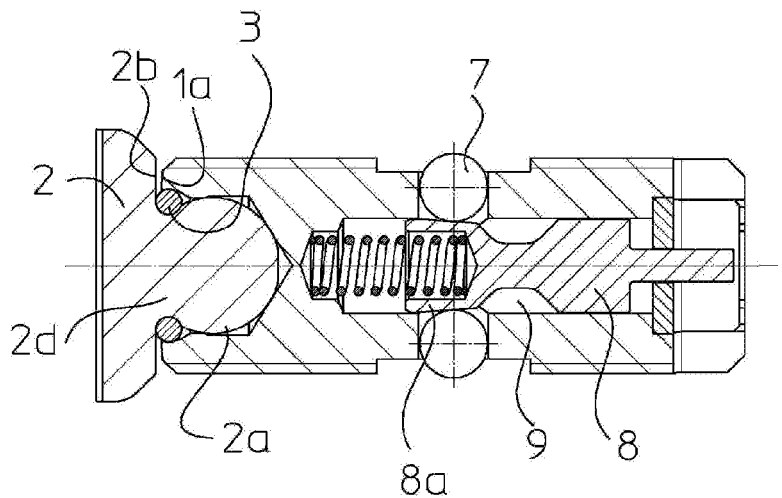
FIG. 4 is a schematic sectional view of a fourth embodiment of an abutment screw having a movable part.

FIG. 4 is a schematic sectional view of a fourth embodiment of the abutment screw 1 with the movable part 2. In contrast to the embodiments illustrated in FIGS. 1 and 2, the abutment screw 1 has in addition a displaceable slide 8 with a spring holder 8a in which is seated one end of the spring 5. In addition, this abutment screw 1 has at least one latch ball 7 that, in the latching position, bears against the outer side of the spring holder 8a. The latch ball 7 is released when it engages in a suitable recess 9 of the displaceable slide 8. Furthermore, this embodiment has a pin 12.

Figure 5:
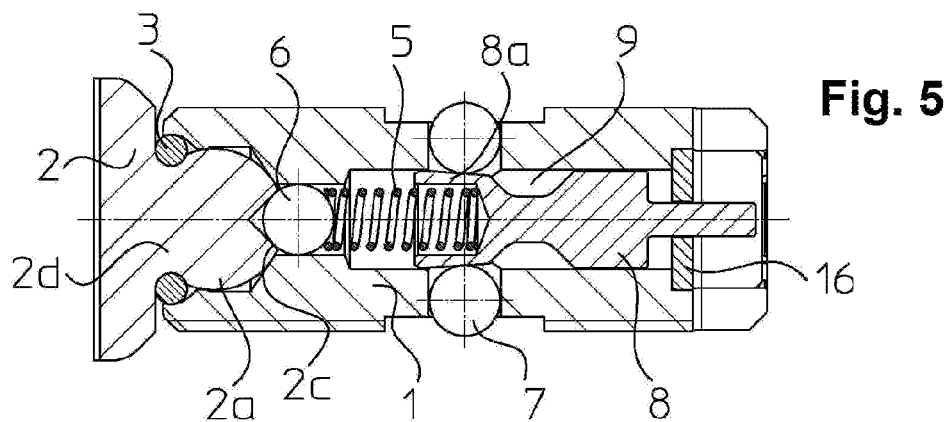
FIG. 5 is a schematic sectional view of a fifth embodiment of an abutment screw having a movable part.

FIG. 5 is a schematic sectional view of a fifth embodiment of the abutment screw 1 with the movable part 2. The fifth embodiment corresponds to a combination of the fourth embodiment with the third embodiment. In addition to the features illustrated in FIG. 4, the substantially spherical ball head 2a has a ball seat or recess 2c for an inner bearing ball 6 against which the other end of the spring 5 bears. Furthermore, FIG. 5 shows a separate closure part 16.

Figure 6:
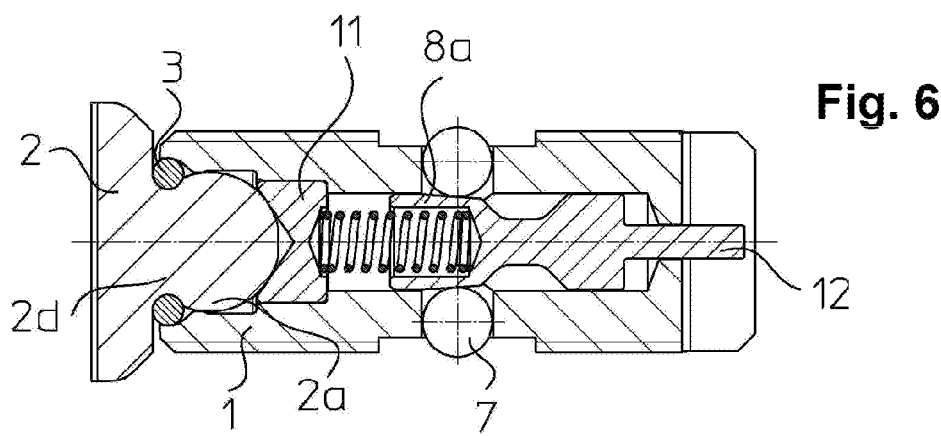
FIG. 6 is a schematic sectional view of a sixth embodiment of an abutment screw having a movable part.

FIG. 6 is a schematic sectional view of a sixth embodiment of the abutment screw 1 with the movable part 2. Instead of the bearing ball 6 according to the fifth embodiment, a part 11 receiving the other end of the spring 5 is provided between the spring 5 and the substantially spherical ball head 2a.

Figure 7:
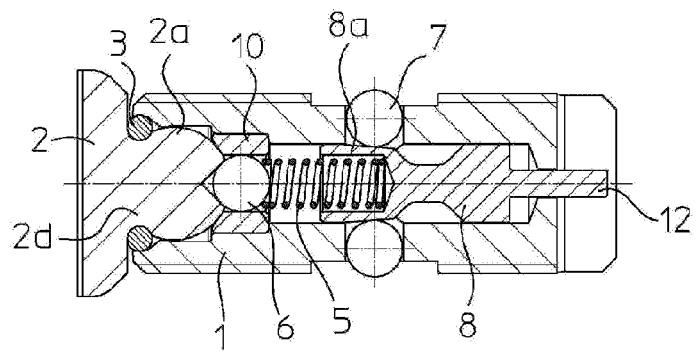
FIG. 7 is a schematic sectional view of a seventh embodiment of an abutment screw having a movable part.

FIG. 7 is a schematic sectional view of a seventh embodiment of the abutment screw 1 with the movable part 2, the seventh embodiment being a modification of the fifth embodiment in that the inner bearing ball 6 is surrounded by a cylindrical sleeve 10.

Figure 9:
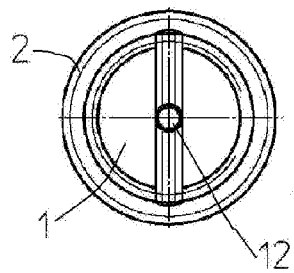
FIG. 9 is a top view of an abutment screw according to the seventh embodiment.
Figure 8:
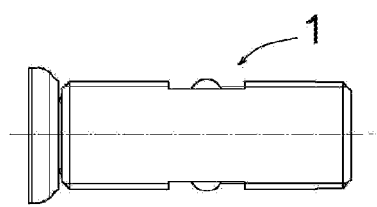
FIG. 8 is a side view of an abutment screw according to the seventh embodiment.

For a better understanding of the invention, a side view of an abutment screw 1 according to the invention is shown in FIG. 8, and an end view of the abutment screw 1 according to the invention is shown in FIG. 9.

Figure 10:
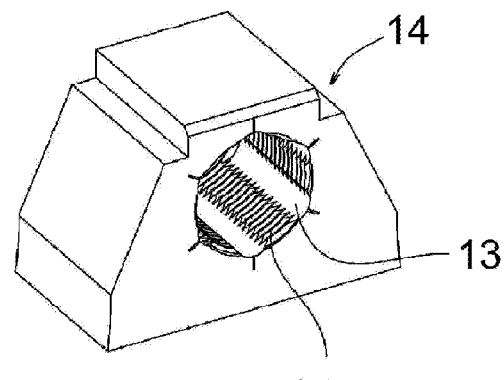
FIG. 10 is a schematic view of a connecting part for the abutment screw in a perspective illustration.
Figure 11:
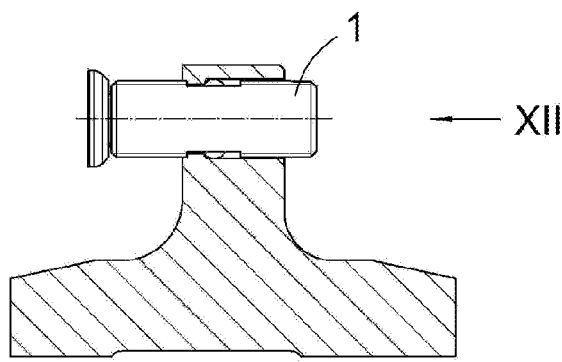
FIG. 11 is a schematic cross-sectional illustration of the connecting part for the abutment screw taken along line XI-XI of FIG. 12.
Figure 12:
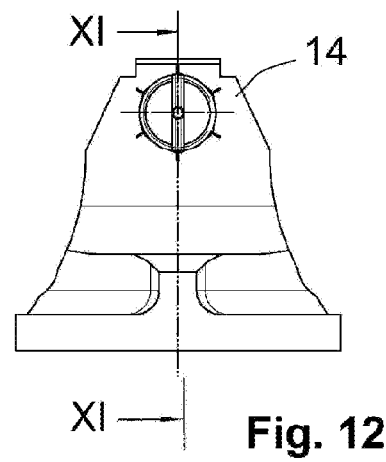
FIG. 12 is a side view of the connecting part for the abutment screw in the direction of arrow XII of FIG. 11.

FIG. 10 is a schematic view of a connecting part 14 for the abutment screw 1 in a perspective illustration. In the connecting part 14, latch grooves 13 for the latch balls 7 are shown. FIG. 11 is a schematic cross-sectional illustration of the connecting part 14 with the abutment screw 1 with the movable part 2 installed, the uninterrupted thread region 15 serving as a protection against contaminants. Finally, FIG. 12 is an end view of the connecting part 14 for the abutment screw 1, this embodiment having six latch grooves 13.

The invention claimed is:

1. In combination:
an abutment screw extending along an axis and having a forwardly open substantially spherical ball seat and an axially extending spring seat opening into the ball seat;
a connecting part formed with a threaded bore in which the abutment screw is threadedly engageable, the bore having at least one radially inwardly open latching groove;
a head having a swivel ball generally complementary to and fitting in the ball seat such that the head can swivel relative to the screw, the screw and head being formed with respective axially confronting contact faces engageable with each other to limit swiveling of the head in the ball seat, the head being formed with an axially rearwardly open ball recess;
an inner ball in the spring seat axially rearward of the ball seat and engageable axially forward in the ball recess;
a slide formed with a radially open latch recess and axially displaceable in the spring seat toward and away from the head axially rearward of the inner ball;
a latch ball radially displaceable in the screw between a radial inner holding position engaging in the latch recess of the slide and preventing axial rearward movement thereof in the screw and a radial outer position permitting such axial rearward movement and projecting radially from the screw such that, when the screw is in the threaded bore and the latch ball is aligned radially with the groove, the latch ball engages in the groove and locks the screw against rotation in the threaded bore while permitting axial movement of the slide and, when the screw is in the threaded bore and the latch ball is engaged in the latch recess, the screw is free to rotate in the bore and the slide is locked against axial movement;
a spring braced axially between the slide and the inner ball and biasing the head inner ball axially forward against the head and biasing the slide axially rearward into the holding position; and
a pin on the displaceable slide projecting axially rearward from the screw such that pushing the pin axially forward shifts the slide out of the holding position and frees the screw to rotate in the connecting part.

2. The combination according to claim 1, wherein the contact faces of the screw and of the swivel ball are annular.

3. The combination according to claim 1, further comprising:
a neck connecting the swivel ball to the head; and
a seal ring on the neck and bearing on the abutment screw.

4. The combination according to claim 1, wherein the latch ball bears in the holding position against an outer surface of the slide, the outer surface being slightly frustoconically tapered.

5. The combination defined in claim 1, wherein there are a plurality of the latch balls distributed angularly around the abutment screw, the threaded bore being formed with a respective one of the grooves for each of the latch balls.

6. The combination defined in claim 1, wherein the spring is a coil spring having a front end bearing axially forward on the inner ball and a rear end bearing axially rearward on the slide.

* * * * *